United States Patent
Lilja et al.

(10) Patent No.: US 12,319,990 B2
(45) Date of Patent: Jun. 3, 2025

(54) GRADIENT CEMENTED CARBIDE BODY AND METHOD OF MANUFACTURING THEREOF

(71) Applicant: SANDVIK MINING AND CONSTRUCTION TOOLS AB, Sandviken (SE)

(72) Inventors: Mirjam Lilja, Stockholm (SE); Ida Borgh, Vastberga (SE); Ioannis Arvanitidis, Stockholm (SE); Leif Akesson, Vastberga (SE); Xueying Hai, Vastberga (SE); Susanne Norgren, Vastberga (SE)

(73) Assignee: Sandvik Mining and Construction Tools AB, Sandviken (SE)

( * ) Notice: Subject to any disclaimer, the term of this patent is extended or adjusted under 35 U.S.C. 154(b) by 600 days.

(21) Appl. No.: 17/625,694

(22) PCT Filed: Jul. 8, 2020

(86) PCT No.: PCT/EP2020/069163
§ 371 (c)(1),
(2) Date: Jan. 7, 2022

(87) PCT Pub. No.: WO2021/005076
PCT Pub. Date: Jan. 14, 2021

(65) Prior Publication Data
US 2022/0275485 A1    Sep. 1, 2022

(51) Int. Cl.
C22C 29/08    (2006.01)
B23B 27/14    (2006.01)
C22C 29/06    (2006.01)

(52) U.S. Cl.
CPC .............. *C22C 29/08* (2013.01); *B23B 27/14* (2013.01); *C22C 29/067* (2013.01)

(58) Field of Classification Search
None
See application file for complete search history.

(56) References Cited

U.S. PATENT DOCUMENTS

| 4,743,515 A | 5/1988 | Fischer et al. |
| 7,128,774 B2 | 10/2006 | Norgren et al. |

(Continued)

FOREIGN PATENT DOCUMENTS

| CN | 102245801 A | 11/2011 |
| CN | 105950937 A | 9/2016 |

(Continued)

OTHER PUBLICATIONS

Iscar, "Family Designation: SNGN (CER)", https://iscar.com/Ecatalog/Item.aspx?cat=3448443&fnum=394&mapp=IT&app=0&GFSTYP=M; accessed Sep. 18, 2024 (Year: 2024).*

(Continued)

*Primary Examiner* — Seth Dumbris
(74) *Attorney, Agent, or Firm* — Corinne R. Gorski (57) ABSTRACT

The present disclosure relates to a method of making a cemented carbide mining insert, a cemented carbide mining insert with having a chemical and hardness gradient and to the use thereof. The method includes the steps of providing a green mining insert compact formed from a first powder including a WC-based hard phase, optionally one or more further hard-phase components and a binder, applying a second powder including a grain refiner compound and/or a carbon based grain growth promoter to at least one portion of a surface of the green mining insert compact, and sintering the green mining insert compact to produce a cemented carbide mining insert, wherein the first powder additionally includes Cr, in an amount such that the mass ratio of Cr/binder is of 0.01-0.3.

5 Claims, 9 Drawing Sheets

(56) References Cited

U.S. PATENT DOCUMENTS

2004/0009088 A1     1/2004   Glatzle et al.
2005/0129951 A1*   6/2005   Collin .................... C22C 1/051
                                                              428/408

FOREIGN PATENT DOCUMENTS

| CN | 107635700 A | 1/2018 |
|---|---|---|
| CN | 108883469 A | 11/2018 |
| EP | 2355948 A1 | 8/2011 |
| JP | 2001179522 A | 7/2001 |
| SU | 911003 A1 | 3/1982 |
| WO | 2010056191 A1 | 11/2009 |
| WO | 2018060125 A1 | 4/2018 |
| WO | 2020099197 A1 | 5/2020 |

OTHER PUBLICATIONS

Dai Dahuang. "Functional Film and Deposition Production Tehcniques thereof". Metallurgical Industry Press, Jan. 31, 2013. pp. 224-227.

* cited by examiner

GRADIENT CEMENTED CARBIDE BODY AND METHOD OF MANUFACTURING THEREOF

RELATED APPLICATION DATA

This application is a § 371 National Stage Application of PCT International Application No. PCT/EP2020/069163 filed Jul. 8, 2020 claiming priority to EP 19185452.0 filed Jul. 10, 2019.

TECHNICAL FIELD

The present disclosure relates method of making a cemented carbide mining insert, a cemented carbide mining insert having a chemical and hardness gradient and to the use thereof.

BACKGROUND

Cemented carbide has a unique combination of high elastic modulus, high hardness, high compressive strength, high wear and abrasion resistance with a good level of toughness. Therefore, cemented carbide is commonly used in products such as mining tools. In general, the hardness and toughness of cemented carbide can be altered by changing the binder content and grain size of the hard phase. Typically, a higher binder content will increase the toughness of the cemented carbide but will decrease its hardness and wear resistance. A finer hard phase grain size will result in cemented carbide with a higher hardness which is more wear resistant, whereas a coarser hard phase grain size will not be as hard but will have higher impact resistance.

For maximised efficiency of cemented carbides mining inserts, a combination of these properties is desired and there are different demands on the material in different parts of the product. For example, in inserts for rock drilling and mineral cutting, it is desirable to have a tougher interior to minimize the risk of failure and a harder exterior to optimise wear resistance.

EP2355948A1 discloses a method of producing a cemented carbide body having a gradient in material properties. Specifically, the method comprises providing: (1) a grain refiner compound and, (2) a grain growth promoter, on at least one portion of the surface of a compact of a WC-based starting material comprising one or more hard-phase components and a binder, and then sintering the compact. This method produces a cemented carbide body comprising a WC-based hard phase and a binder phase, wherein at least one part of an intermediate surface zone has a lower average binder content than a part further into the body, and at least one part of an upper surface zone has on average a larger average WC grain size than the intermediate surface zone.

There is however still a need to further optimise the properties of the cemented carbide mining inserts so that they last longer and have improved operative performance.

Definitions

The term "bulk" is herein meant the cemented carbide of the innermost part (centre) of the rock drill insert and for this disclosure is the zone having the lowest hardness.

The term "green" refers to a cemented carbide mining insert produced by milling the hard phase component(s) and the binder together and then pressing the milled powder to form a compact cemented carbide mining insert, which has not yet been sintered.

The term "carbon based" means a compound that can release carbon and could for example be free carbon, graphite, soot, a carbide, or an organic compound e.g. a cellulose.

SUMMARY

Thus, the present disclosure therefore provides a method of producing a cemented carbide mining insert comprising the steps of:
  providing a green mining insert compact formed from a first powder comprising a WC-based hard phase, optionally one or more further hard-phase components and a binder;
  applying a second powder comprising a grain refiner compound and/or a carbon based grain growth promoter to at least one portion of the surface of the green mining insert compact; and
  sintering the green mining insert compact to produce a cemented carbide mining insert;
characterized in that said first powder additionally comprises Cr, in an amount such that the mass ratio of Cr/binder is of 0.01-0.3.

The advantage of this method is that it provides a means to produce a cemented carbide mining insert having the chemical and hardness gradient profile desired to achieve high wear performance.

Additionally, the present disclosure provides a cemented carbide mining insert comprising one or more hard-phase components and a binder characterised in that:
  the mass ratio of % Cr/% binder in the bulk is at least 0.03; and
  there is a % Cr/% binder mass ratio gradient from at least one part of the surface to the bulk of the cemented carbide mining insert wherein $(R_{max}+R_{min})/2$ is at a depth of between 8-70%, in percentage of the total height of the sintered cemented carbide mining insert, where $R_{max}$ is the maximum % Cr/% binder mass ratio and $R_{min}$ is the minimum % Cr/% binder mass ratio.

The advantage of this cemented carbide mining insert is that is provides improved wear properties and therefore the inserts will have a longer lifetime in the field.

DETAILED DESCRIPTION

According to one aspect the present disclosure relates to a method of producing a cemented carbide mining insert comprising the steps of:

providing a green mining insert compact formed from a first powder comprising a WC-based hard phase, optionally one or more further hard-phase components and a binder;

applying a second powder comprising a grain refiner compound and/or a carbon based grain growth promoter to at least one portion of the surface of the green mining insert compact; and sintering the green mining insert compact to produce a cemented carbide mining insert;

characterized in that said the first powder additionally comprises Cr, in an amount such that the mass ratio of Cr/binder is of 0.01-0.3.

In the present disclosure, the term "green" refers to a cemented carbide mining insert produced by milling the hard phase component(s) and the binder together and then pressing the milled powder to form a compact cemented carbide mining insert, which has not yet been sintered.

In the present disclosure, the term "WC-based" means that the hard phase comprises at least 80 wt % WC, preferably at least 90 wt %. The WC grain size is chosen to suit the desired end properties of the cemented carbide, for example the required thermal conductivity, hardness and toughness. If the grain size is too small, the cemented carbide will not be tough enough. Therefore, the WC grain size of the raw material could suitably be 1 μm, preferably >1.25 μm, more preferably >1.5 μm, even more preferably >1.75 μm, most preferably >2.0 μm. If the grain size is too large, the material becomes difficult to sinter and not hard enough. Therefore, the WC grain size of the raw material could suitably be <18 μm, preferably <10 μm. The WC grain sizes are measured using Fisher Model 95 Sub-Sieve Sizer (FSSS) prior to milling.

The one or more further hard-phase components may be selected from TaC, TiC, TiN, TiCN, NbC. The binder may be selected from Co, Ni, Fe or a mixture thereof, preferably Co and/or Ni, most preferable Co. The carbide mining insert has a suitable binder content of from about 4 to about 30 wt %, preferably from about 5 to about 15 wt % which provides the optimised balance between hardness and toughness for mining inserts. The cemented carbide mining insert may optionally also comprise a grain refiner compound in an amount of 20 wt % of the binder content. The grain refiner compound is suitably selected from the group of carbides, mixed carbides, carbonitrides or nitrides of vanadium, chromium, tantalum and niobium.

It has been noticed that importantly the first powder also comprises Cr, in an amount such that the mass ratio of Cr/binder is of 0.01-0.3. The mass ratio of the Cr/binder is calculated by dividing the weight percentage (wt %) of the Cr added to powder blend by the wt % of the binder in the powder blend, wherein the weight percentages are based on the weight of that component compared to the total weight of the powder blend. To a great extent the Cr is dissolved into the binder phase, however there could be some amount, e.g. up to 1 area % detected from the SEM image analysis, of undissolved chromium carbide in the cemented carbide body. It may however be preferable to only add Cr up to the mass ratio of Cr/binder so that all the Cr dissolved into the binder so that the sintered cemented carbide body is free of undissolved chromium carbides.

The addition of the Cr also has the effect of improving the corrosion resistance of the cemented carbide body. The presence of the Cr also makes the binder prone to transform from fcc to hcp during drilling, this is beneficial for absorbing some of the energy generated in the drilling operation. The transformation will thereby harden the binder phase and reduce the wear of the button during use thereof. The presence of the Cr will increase the wear resistance of the cemented carbide and increase its ability for deformation harden. The combination of the Cr in the cemented carbide powder and the application of the powder comprising a grain refiner compound and optionally a carbon based grain growth promoter, to at least one portion of the surface of the compact produces a cemented carbide body having a chemical and hardness gradient which produce a cemented carbide mining insert with high wear resistance.

The mass ratio of Cr/binder is between 0.01-0.3, preferably between 0.02-0.25, most preferably 0.03-0.18. If the mass ratio of Cr/binder is too low, the positive effects of the Cr will be too small. If, on the other hand, the mass ratio of the Cr/binder is too high, there will be an increased formation in the concentration of chromium carbides, in which the binder will dissolve, thereby reducing the volume of the binder phase and consequently making the cemented carbide body too brittle. The optimal balance between gaining the maximized positive effects from the addition of the Cr without adding too much that the brittleness of the cemented carbide is increased is achieved to an even greater extend in the preferred ranges.

The Cr is normally added to the powder blend in the form of $Cr_3C_2$ as this provides the highest proportion of Cr per gram of powder, although it is be understood that the Cr could be added to the powder blend using an alternative chromium carbide such as $Cr_{23}C_6$ or $Cr_7C_3$ or as a chromium nitride.

Apart from the hard-phase forming component, the binder and Cr containing component, incidental impurities may be present in the WC-based starting material.

The green mining insert compact is produced by milling together a powder blend containing all the hard phase, binder, Cr containing and any other powder components and then pressing the powder into the shape of a mining insert. Carbon and/or tungsten may also be added to the powder blend to provide the desired carbon balance in the cemented carbide powder.

A second powder comprising a grain refiner compound and/or a carbon based grain growth promoter is then applied to at least one portion of the surface of the green mining insert compact. The grain refiner is suitably chromium, vanadium, tantalum or niobium, preferably chromium or vanadium, most preferably chromium. The grain refiner compound is suitably a carbide, mixed carbide, carbonitride or a nitride. The grain refiner compound is suitably selected from the group of carbides, mixed carbides, carbonitrides or nitrides of vanadium, chromium, tantalum and niobium. Preferably, the grain refiner compound is a carbide or nitride of chromium or vanadium, such as $Cr_3C_2$, $Cr_{23}C_6$, $Cr_7C_3$, $Cr_2N$, CrN or VC, most preferably carbides of chromium, such as $Cr_3C_2$, $Cr_{23}C_6$, or $Cr_7C_3$. The grain growth promoter is preferably promoting migration of binder into the cemented carbide body. The grain growth promoter is suitably carbon. The carbon provided onto the surface of the compact may be in the form of deposited carbon from a carburizing atmosphere, amorphous carbon, which is present in e.g. soot and carbon black, or graphite. Preferably, the carbon is in the form of soot or graphite. The second powder applied to at least a portion of the surface of the green mining insert may comprise only the grain refiner compound or only the carbon based grain growth promotor or both the grain refiner compound and the carbon based grain growth promotor.

If the second powder comprises both a grain refiner compound and a carbon based grain growth promotor the weight ratio of grain refiner compound, to grain growth promoter, is suitably from about 0.05 to about 50, preferably from about 0.1 to about 25, more preferably from about 0.2 to about 15, even more preferably from about 0.3 to about 13.

The grain refiner compound is suitably provided onto the surface or surfaces in an amount of from about 0.1 to about 100 mg/cm2, preferably in an amount of from about 1 to about 50 mg/cm2. The grain growth promoter is suitably provided onto the surface or surfaces in an amount of from about 0.1 to about 20 mg/cm2, preferably in an amount of from about 0.2 to about 15 mg/cm2.

One portion or several separate portions of the compact may be provided with the grain refiner compound and grain growth promoter.

The grain refiner compound and/or grain growth promoter may be provided by application in the form of a separate or combined liquid dispersion or slurry to the compact. In such a case, the liquid phase is suitably water, an alcohol or a polymer such as polyethylene glycol. The grain refiner compound and grain growth promoter may alternatively be provided by application in the form of solid substances to the compact, preferably powder. The application of the grain refiner compound and grain growth promoter onto the compact is suitably made by applying the grain refiner compound and grain growth promoter onto the compact by, dipping, spraying, painting, or application onto the compact in any other way. When the grain growth promoter is carbon, it may alternatively be provided onto the compact from a carburizing atmosphere. The carburizing atmosphere suitably comprises one or more of carbon monoxide or a C1-C4 alkane, i.e. methane, ethane, propane or butane. The carburizing is suitably conducted at a temperature of from about 1200 to about 1550° C. Preferably, the powder is applied to 10-100% of the surface area of the body.

Alternatively, the grain refiner compound and/or the grain growth promoter are applied on the surface of a compact by combining the grain refiner compound and/or the grain growth promoter with a WC-based starting material powder which is then pressed into a compact. The provision of the grain refiner compound and/or grain growth promoter on the surface of the compact is suitably made by introducing the grain refiner compound and/or the grain growth promoter into a pressing mould prior to the introduction of a WC-based starting material powder followed by pressing. The grain refiner compound and/or grain growth promoter are suitably introduced into the pressing mould as a dispersion or slurry. In such a case, the liquid phase in which the grain refiner compound is dispersed or dissolved is suitably water, an alcohol or a polymer such as polyethylene glycol. Alternatively, one or both of the grain refiner compound and grain growth promoter is introduced into the pressing mould as a solid substance.

The green mining insert compact is then sintered to produce the cemented carbide mining insert. The sintering temperature is suitably from about 1300° C. to about 1600° C., preferably from about 1350° C. to about 1550° C. to prevent abnormal grain growth. The sintering time is suitably from about 15 minutes to about 5 hours, preferably from about 30 minutes to about 2 hours. Normally, a grinding step is then employed to obtain the precise dimensions of the cemented carbide body as required. If the cemented carbide body in a mining insert for rock drilling, the insert will generally have a cylindrical base part and a rounded top, which maybe hemispherical, conical or asymmetric. Typically, the curved surface of the cylindrical base part is ground to obtain the precise diameter required, while the surfaces of the top part and the cylindrical base part are kept in their sintered state. During sintering the grain refiner is diffused away from the surface or surfaces provided with the grain refiner compound.

In one embodiment the cemented carbide mining insert is treated with a tumbling process. The cemented carbide mining inserts are subjected to a post-treatment surface hardening which introduces high levels of compressive stress into the inserts. For mining inserts, this would normally be a tumbling treatment, which could be centrifugal or vibrational. However, other post-treatments surface hardening methods, e.g. shot peening, could be used. Following tumbling, normally an increase in magnetic coercivity (kA/m) is measured.

A "standard" tumbling process would typically be done using a vibrational tumbler, such as a Reni Cirillo RC 650, where about 30 kg inserts would be tumbled at 50 Hz for about 40 minutes. An alternative typical "standard" tumbling process would be using a centrifugal tumbler such as the ERBA-120 having a closed lid at the top and has a rotating disc at the bottom. Cooling water with antioxidants is continuously fed with 5 liters per minute when the disc (0600 mm) rotates. Cemented carbide media can also be added to increase the load in the tumbler. The rotation causes the inserts to collide with other inserts or with any media added. The collision and sliding removes sharp edges and causes strain hardening. For "standard" tumbling using a centrifugal tumbler the tumbling operation would typically be run from 120 RPM for at least 20 minutes.

In one embodiment of the method, the tumbling process is a "High Energy Tumbling" (HET) method. To introduce higher levels of compressive stresses into the cemented carbide mining insert a high energy tumbling process may be used. There are many different possible process set ups that could be used to introduce HET, including the type of tumbler, the volume of media added (if any), the treatment time and the process set up, e.g. RPM for a centrifugal tumbler etc. Therefore, the most appropriate way to define HET is in terms of "any process set up that introduces a specific degree of deformation hardening in a homogenous cemented carbide mining insert consisting of WC—Co, having a mass of about 20 g". In the present disclosure, HET is defined as a tumbling treatment that would introduce a hardness change, measured using HV3, after tumbling ($\Delta HV3\%$) of at least:

$$\Delta HV3\% = 9.72 - 0.00543 * HV3_{bulk} \quad \text{(equation 1)}$$

Wherein:

$$\Delta HV3\% = 100 * (HV3_{0.3\ mm} - HV3_{bulk})/HV3_{bulk} \quad \text{(equation 2)}$$

$HV3_{bulk}$ is an average of at least 30 indentations points measured in the innermost (centre) of the cemented carbide mining insert and $HV3_{0.3\ mm}$ is an average of at least 30 indentation points at 0.3 mm below the tumbled surface of the cemented carbide mining insert. This is based on the measurements being made on a cemented carbide mining insert having homogenous properties. By "homogeneous properties" we mean that post sintering the hardness different is no more than 1% from the surface zone to the bulk zone. The tumbling parameters used to achieve the deformation hardening described in equations (1) and (2) on a homogenous cemented carbide mining insert would be applied to cemented carbide bodies having a gradient property.

HET tumbling may typically be performed using an ERBA 120, having a disc size of about 600 mm, running at about 150 RPM if the tumbling operation is either performed without media or with media that is larger in size than the inserts being tumbled, or at about 200 RPM if the media used is smaller in size than the inserts being tumbled; Using a Rosier tumbler, having a disc size of about 350 mm, at about 200 RPM if the tumbling operation is either performed without media or with media that is larger in size than the inserts being tumbled, or at about 280 RPM if the media used is smaller in size than the inserts being tumbled. Typically, the parts are tumbled for at least 40-60 minutes.

Another aspect of the present invention relates to a cemented carbide mining insert comprising one or more hard-phase components and a binder characterised in that:
- the mass ratio of % Cr/% binder in the bulk ($R_{bulk}$) is at least 0.03; and
- there is a % Cr/% binder mass ratio gradient from at least one part of the surface to the bulk of the cemented carbide mining insert wherein ($R_{max}+R_{min}$)/2 is at a depth of between 8-70%, preferably 10-60%, most preferably 10-50%, in percentage of the total height of the sintered cemented carbide mining insert, where $R_{max}$ is the maximum % Cr/% binder mass ratio and $R_{min}$ is the minimum % Cr/% binder mass ratio.

$R_{min}$ is often located between the middle and the bottom of the insert, and $R_{max}$ is the is often located just at or just below the insert top.

In one embodiment, the binder is preferably Co, therefore % binder refers to % Co.

In one embodiment, the maximum % Cr/% binder mass ratio ($R_{max}$) is at least 0.010, preferably 0.012 higher than the % Cr/% binder mass ratio in the bulk ($R_{bulk}$) of the cemented carbide mining insert.

In one embodiment, there is a minimum % binder (% $binder_{min}$) at a depth, in percentage of the total height of the sintered cemented carbide mining insert, of 0-8%, preferably 0-5%.

In one embodiment, the ratio of minimum % binder (% $binder_{min}$)/% binder in the bulk (% $binder_{bulk}$) is between 0.2-0.99, preferably between 0.3-0.95.

The chemical concentrations within the cemented carbide mining insert are measured using wavelength dispersive spectroscopy (WDS) along the centreline of a cross sectioned cemented carbide mining insert.

This chemical gradient is important because it introduces more compressive stress which is beneficial to improving the wear properties of the cemented carbide. Compressive stresses are also introduced from the tumbling process, the amount of compressive stress introduced is enhanced by the presence of the chromium. Furthermore, the presence of the chromium improves the corrosion resistance of the mining insert. The depletion in the binder concentration near the surface of the insert also aids the wear resistance.

In one embodiment (Cr, binder, W)C precipitates, for example (Cr, Co, W)C precipitates, may also be present in the cemented carbide mining inserts of the present invention. Without being bound by this theory, one hypothesis is that the presence of these precipitates prevents dislocations in the material forming.

In one embodiment, there is a hardness gradient post HET from at least one part of the surface to the bulk of the cemented carbide, such that:
- the HV3 hardness at a depth of 0.3 mm ($HV3_{0.3\ mm}$) is at 3%, preferably 5%, greater than the HV3 hardness in the bulk ($HV3_{bulk}$) of the cemented carbide mining insert.

The hardness of the cemented carbide inserts is measured using Vickers hardness mapping. The cemented carbide bodies, are sectioned along the longitudinal axis and polished using standard procedures. Vickers indentations at a 3 kg load are then symmetrically distributed over the polished section. The hardness measurements are performed using a programmable hardness tester, KB30S by KB Prüftechnik GmbH calibrated against HV3 test blocks issued by Euro Products Calibration Laboratory, UK. Hardness is measured according to ISO EN6507.

HV3 measurements were done in the following way:
- Scanning the edge of the sample.
- Programming the hardness tester to make indentations at specified distances from the edge of the sample.
- Indentation with 3 kg load at all programmed co-ordinates.
- The computer moves the stage to each co-ordinate with an indentation and runs auto adjust light, auto focus and the automatically measures the size of each indentation.
- The user inspects all the photos of the indentations for focus and other matters that disturb the result.

This hardness gradient is beneficial for increasing the wear resistance of the cemented carbide inserts.

Another aspect of the present disclosure relates to the use of the cemented carbide mining insert as described hereinbefore or hereinafter for rock drilling or oil and gas drilling.

In one embodiment, the cemented carbide body of the present invention are used as rock drill/mining inserts. The mining inserts are mounted in both drill bit bodies of a top hammer (TH) device or a down-the-hole (DTH) drilling device or a rotary drilling device or a cutting disc device. The rotary drilling device may be an oil and gas rotary cutter device. The invention also relates to a rock drill device, in particular a top-hammer device, or a down-the-hole drilling device, or a rotary drilling device, or a cutting disc device as well as the use of a rock drill insert according to the invention in such a device.

The following examples are illustrative, non-limiting examples.

EXAMPLES

Summary of Samples

Table 1 summaries the compositions of the samples used in the examples, showing the Cr/Co mass ratio and whether a slurry has been applied to the surface of the cemented carbide compact or not. Samples with 6 wt % Co represent a typical cemented carbide grade used for a down-the-hole (DTH) tool, whereas samples with 10% Co represent a typical grade used for rotary tools.

TABLE 1

Summary of samples

| Sample | Powder blend (as weighed in) | | | Cr/ Co(binder) mass ratio | Slurry applied to surface |
|---|---|---|---|---|---|
| | WC (wt %) | Co (wt %) | $Cr_3C_2$ (wt %) | | |
| A (comparative) | 94 | 6 | 0 | 0 | No |
| B (comparative) | 94 | 6 | 0 | 0 | Yes |
| C (comparative) | 93.742 | 6 | 0.258 | 0.043 | No |
| D (invention) | 93.742 | 6 | 0.258 | 0.043 | Yes |
| E (comparative) | 93.580 | 6 | 0.42 | 0.070 | No |
| F (invention) | 93.580 | 6 | 0.42 | 0.070 | Yes |
| G (comparative) | 90 | 10 | 0 | 0 | No |
| H (comparative) | 90 | 10 | 0 | 0 | Yes |
| I (comparative) | 89.3 | 10 | 0.7 | 0.07 | No |
| J (invention) | 89.3 | 10 | 0.7 | 0.07 | Yes |

For samples A to J in Table 1 the cemented carbide inserts were produced using a WC powder grain size measured as FSSS was before milling between 5 and 18 µm. The WC and Co powders were milled in a ball mill in wet conditions, using ethanol, with an addition of 2 wt % polyethylene glycol (PEG 8000) as organic binder (pressing agent) and cemented carbide milling bodies. After milling, the slurry was spray-dried in $N_2$-atmosphere and then uniaxially pressed into green mining inserts having a size of about 22 mm in outer diameter (OD) and about 27-28 mm in height with a weight of approximately 93 g each with a spherical dome ("cutting edge") on the top for samples A-F and green mining inserts having a size of about 21 mm in outer diameter (OD) and about 26-27 mm in height with a weight of approximately 60 g each with a spherical dome ("cutting edge") on the top for samples G-J.

Samples A, C, E, G and I had no slurry applied. Samples B, D, F, had a slurry comprising of 35 wt % $Cr_3C_2$ and 7 wt % graphite dispersed in water applied to the surface of the cemented carbide mining insert so that about 60% of the total insert length was exposed to the slurry. Samples H and J had a slurry comprising of 25 wt % $Cr_3C_2$ and 5 wt % graphite dispersed in water applied to the surface of the cemented carbide mining insert so that about 60% of the total insert length was exposed to the slurry. The slurry was applied using a using a dipping technique, to the top, domed surface of the cemented carbide mining inserts. For these examples, the slurry was applied symmetrically, i.e. applied to the domed surface extending an equal distance down the each of the sides of the insert. All the samples were sintered using Sinter-HIP in 55 bar Ar-pressure at 1410° C. for 1 hour, the OD of the mining inserts was approximately 18 mm for samples A-F and approximately 17 mm for samples G-J after sintering. The inserts were ground on the negative part but leaving the dome and bottom part in an as-sintered condition.

Example 1—Chemical Analysis

The chemical gradient of the sample was investigated by means of wavelength dispersive spectroscopy (WDS) analysis using a Jeol JXA-8530F microprobe. The accuracy of WDS measurements is higher when >0.2 mm from the surface of the sample edge. Line scans along the centre line were done on cross sections of the sintered materials, prior to tumbling. Samples were prepared by precision cutter, followed by mechanical grinding and polishing. The final step of the sample preparation was carried out by polishing with 1 µm diamond paste on a soft cloth. An acceleration voltage of 15 kV was used to perform line scans with a step size of 100 µm and a probe diameter of 100 µm. Three line scans per sample were carried out and the average is reported. The cobalt concentration profiles are compared in FIG. 1, the chromium concentration profiles are compared in FIG. 2 and the Cr/Co concentration profiles are compared in FIG. 3 for samples B, C, D, E and F (i.e. the 6% Co samples). The cobalt concentration profiles are compared in FIG. 4 for samples G, H, I and J, the chromium concentration profiles are compared in FIG. 5 for samples H, I and J and the Cr/Co concentration profiles are compared in FIG. 6 for samples H, I and J (i.e. the 10% Co samples). Key measurements of the chemical profiles are recorded in table 2. FIGS. 1 to 6 and table 2 show that the inventive samples D, F and J all have chemical composition profiles that fall within the scope of the claims. For samples where there is no gradient in the mass ratio of % Cr/% binder from at least one part of the surface to the bulk no depth of $[(R_{max}+R_{min})/2]$ value is recorded.

TABLE 2

| | Co and Cr chemical analysis | | | | | |
|---|---|---|---|---|---|---|
| Sample | $R_{bulk}$ | Depth of $(R_{max} + R_{min})/2$ (in percentage of total height of the sintered insert) | $R_{max}$ | $R_{max} - R_{bulk}$ | Depth of % $Co_{min}$ (in percentage of total height of sintered insert) | Ratio of minimum % binder (% binder$_{min}$)/ % binder in the bulk (% binder$_{bulk}$) |
| B | 0.004 | 10 | 0.064 | 0.06 | 0 | 0.6 |
| C | 0.047 | — | — | — | — | — |
| D | 0.048 | 13 | 0.117 | 0.07 | 0 | 0.5 |
| E | 0.070 | — | — | — | — | — |
| F | 0.075 | 11 | 0.183 | 0.11 | 0 | 0.4 |
| G | — | — | — | — | — | — |
| H | 0 | 24 | 0.013 | 0.013 | 0 | 0.6 |
| I | 0.058 | — | 0.062 | 0.004 | — | — |
| J | 0.069 | 25 | 0.081 | 0.012 | 0 | 0.9 |

WDS was also used to probe for the presence of (Cr, binder, W)C precipitates in samples B (comparison), D (invention) and F (invention). A significantly higher amount of (Cr, binder, W)C precipitation was detected in samples D and F, both near the surface and in the bulk, compared to sample B, as shown in Table 3. In this example (Cr, binder, W)C is (Cr, Co, W)C.

TABLE 3

| (Cr, binder, W)C precipitates | | |
|---|---|---|
| Sample | (Cr, binder, W)C precipitate concentration- 0.3 mm below the surface where the slurry was applied (%) | (Cr, binder, W)C precipitate concentration in the bulk (%) |
| B (comparison) | 0 | 0 |
| D (invention) | 0.0093 | 0.00074 |
| F (invention) | 0.32 | 0.033 |

Example 2—Hardness Profiles

Figure 1:
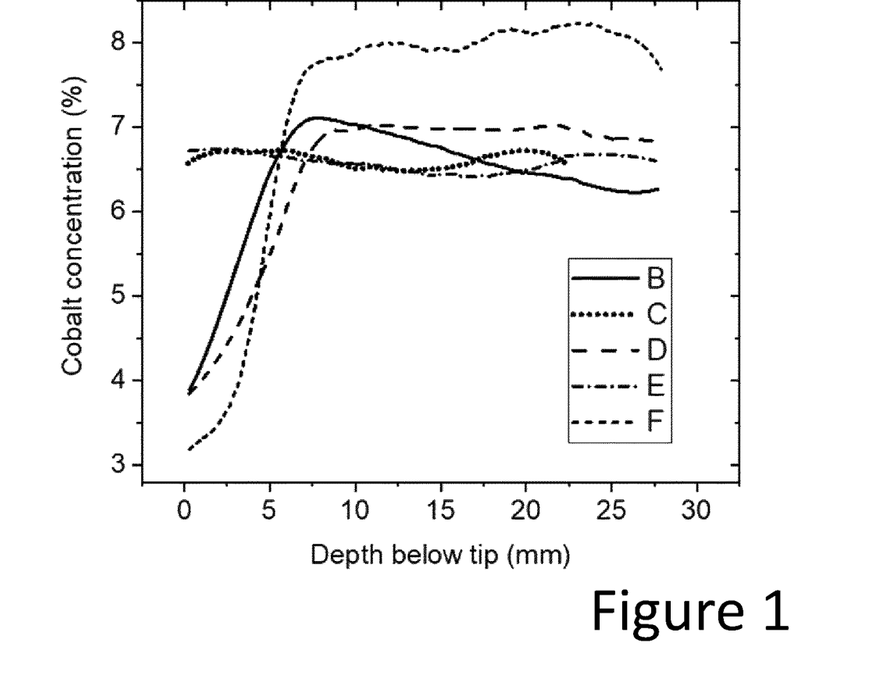
FIG. 1: Co concentration profiles for samples B, C, D, E and F.
Figure 2:
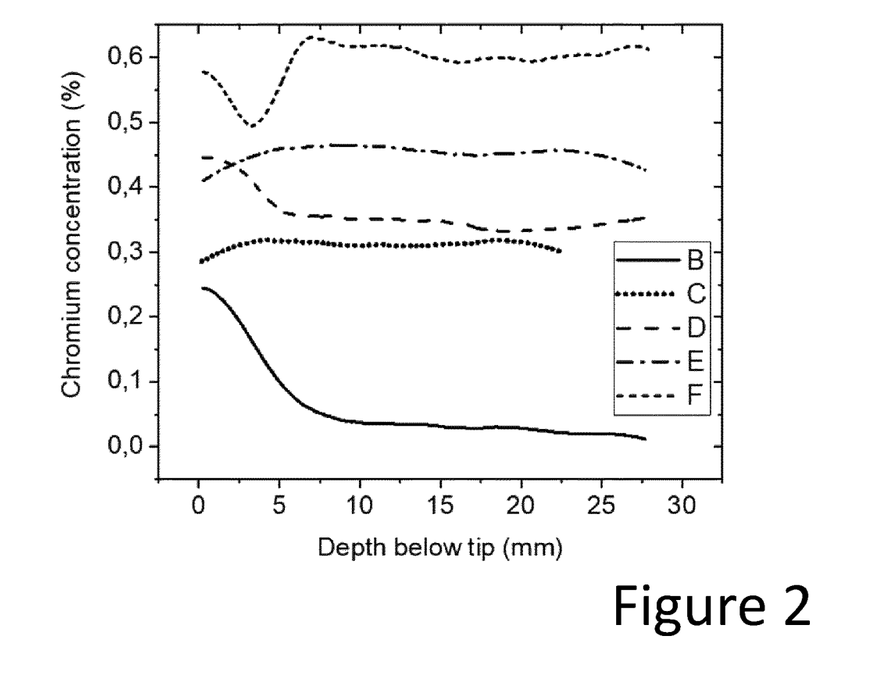
FIG. 2: Cr concentration profiles for samples B, C, D, E and F.
Figure 3:
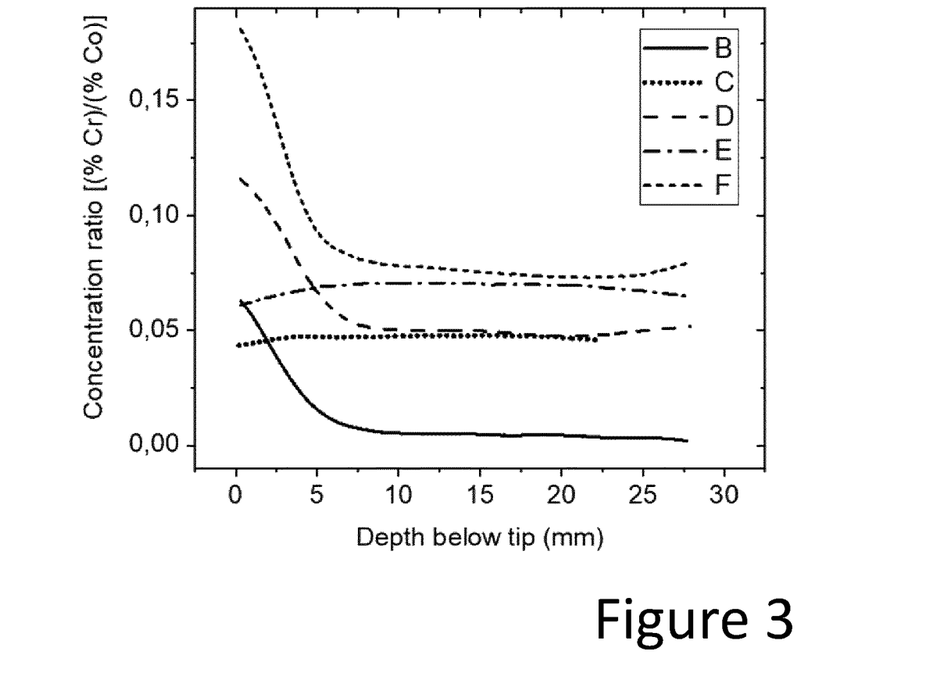
FIG. 3: Cr/Co concentration profiles for samples B, C, D, E and F.
Figure 4:
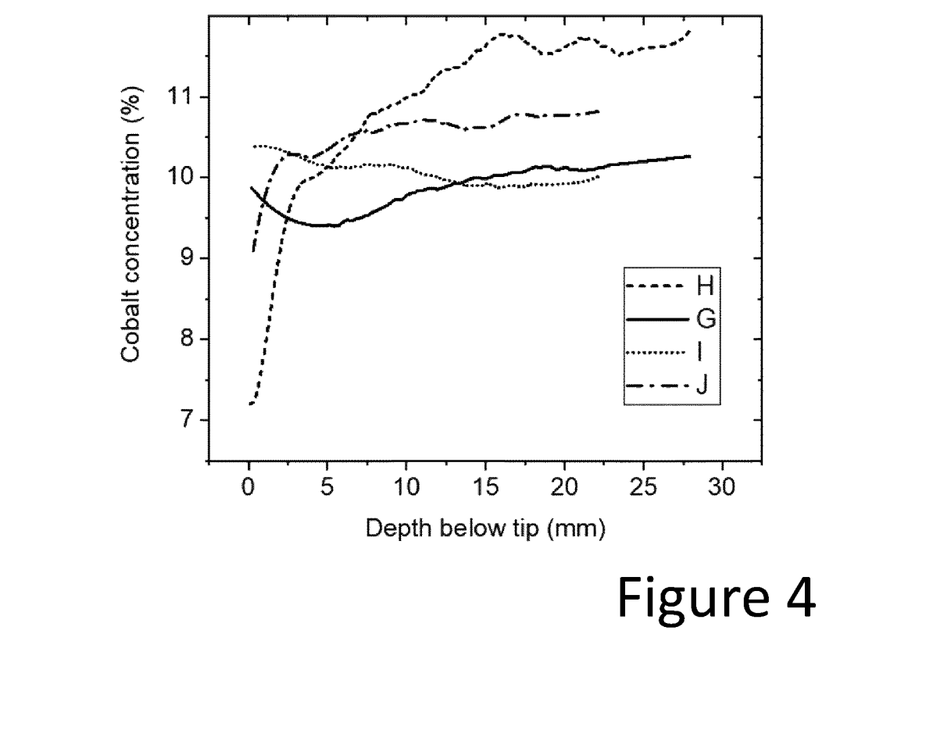
FIG. 4: Co concentration profiles for samples G, H, I and J.
Figure 5:
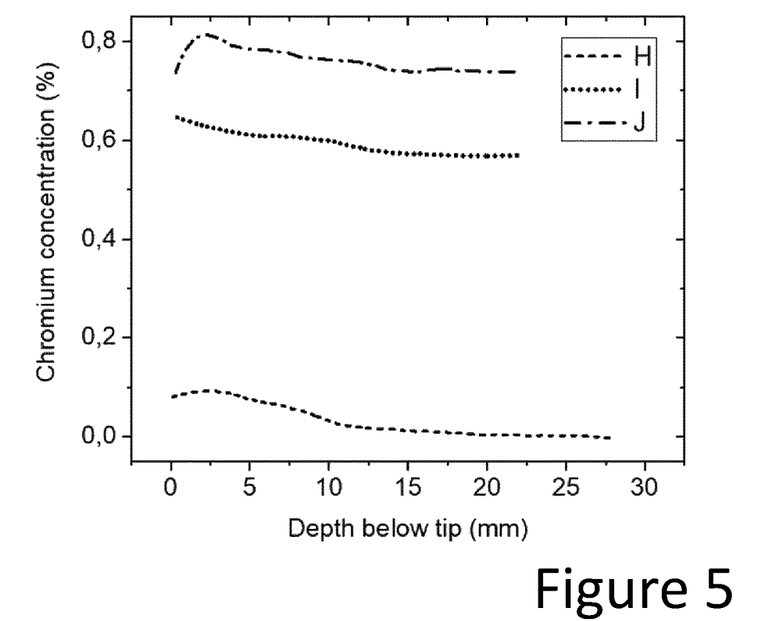
FIG. 5: Cr concentration profiles for samples H, I and J.
Figure 6:
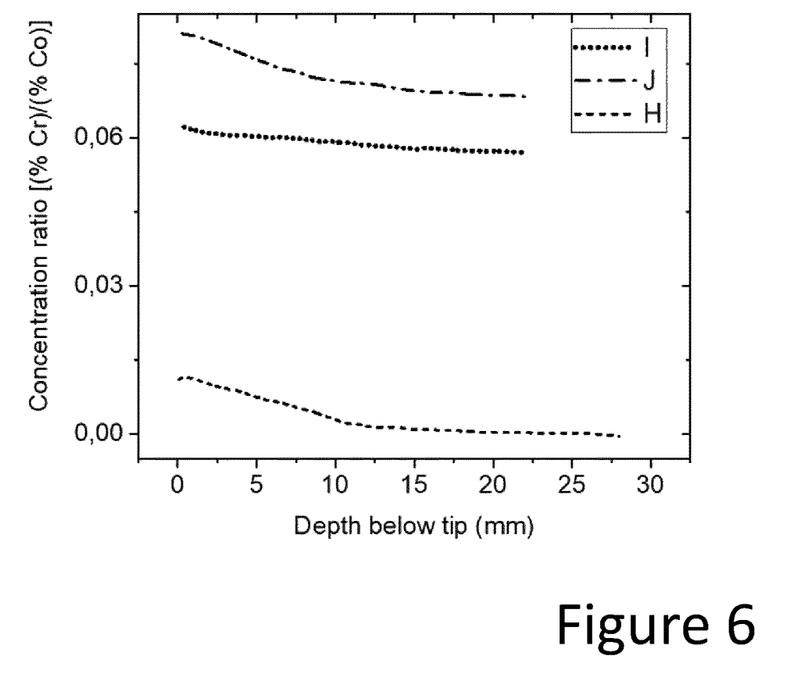
FIG. 6: Cr/Co concentration profiles for samples H, I and J.
Figure 7:
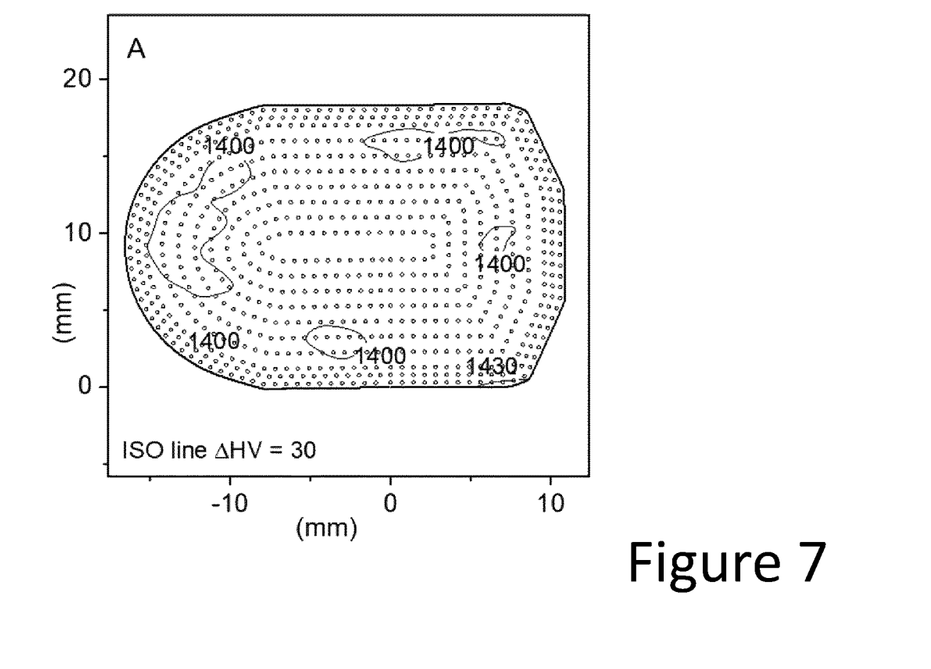
FIGS. 7-16 show iso-hardness plots for samples A, B, C, D, E, F, G, H, I and J respectively.
Figure 8:
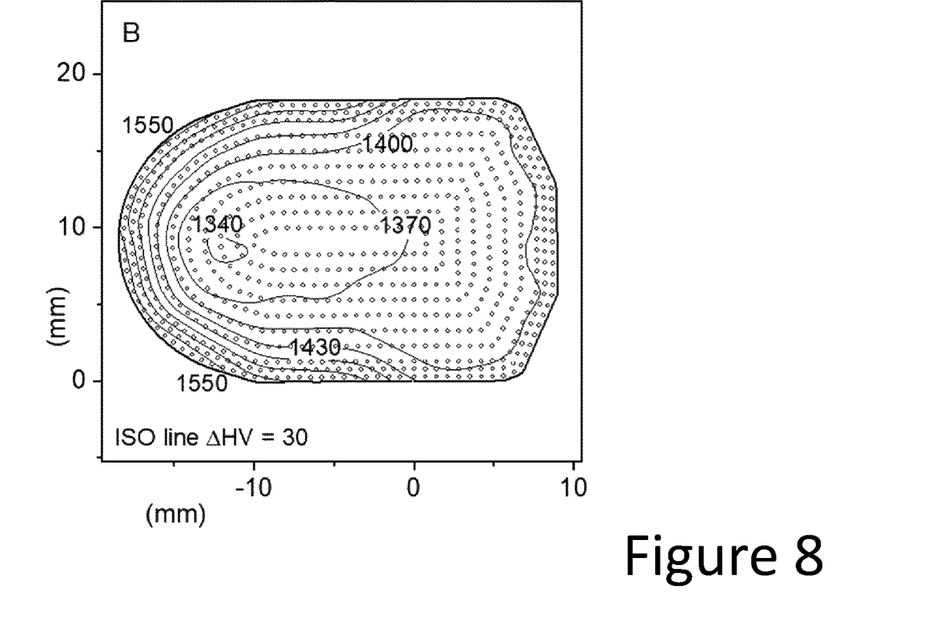
Figure 9:
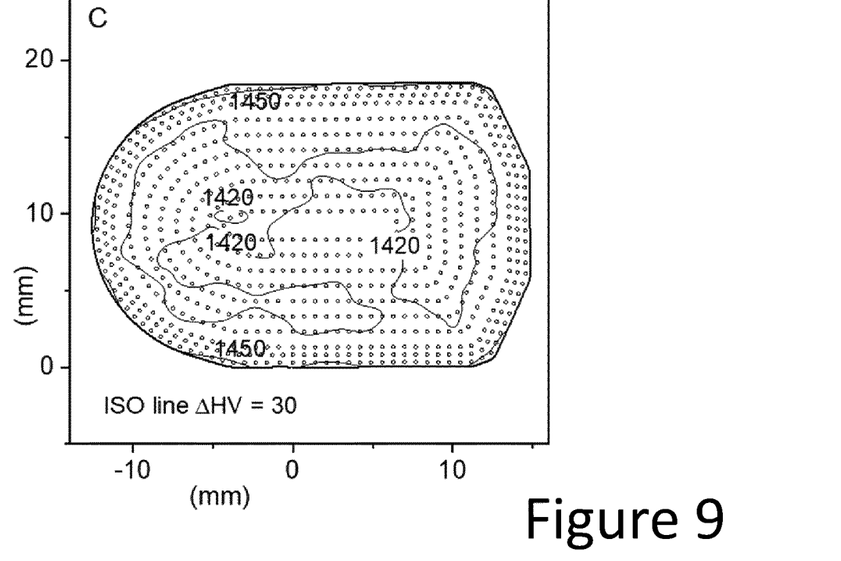
Figure 10:
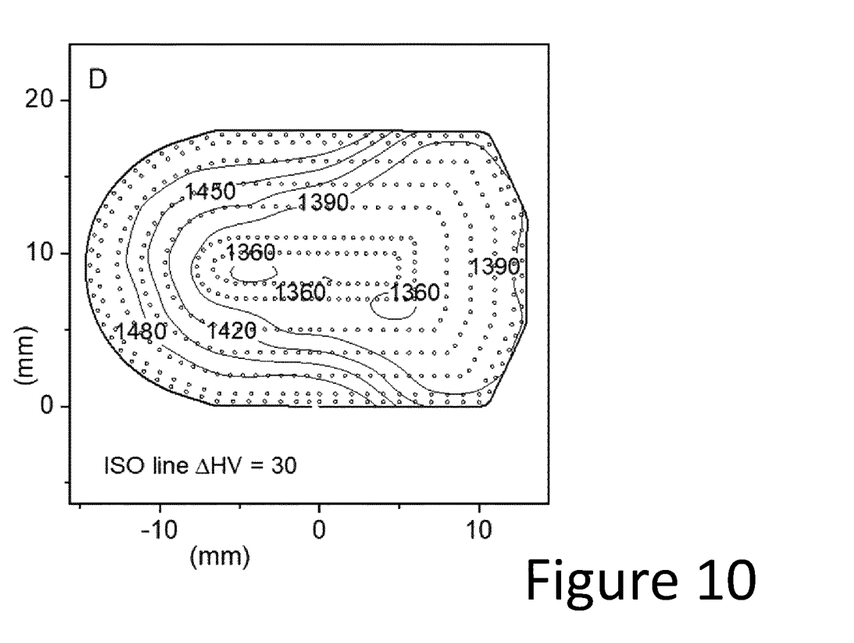
Figure 11:
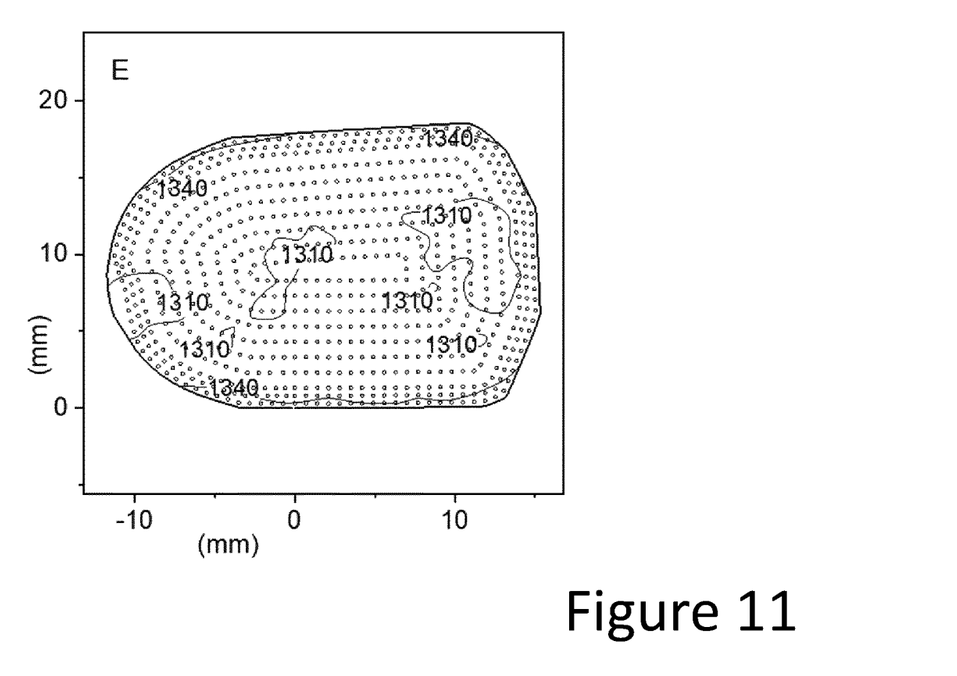
Figure 12:
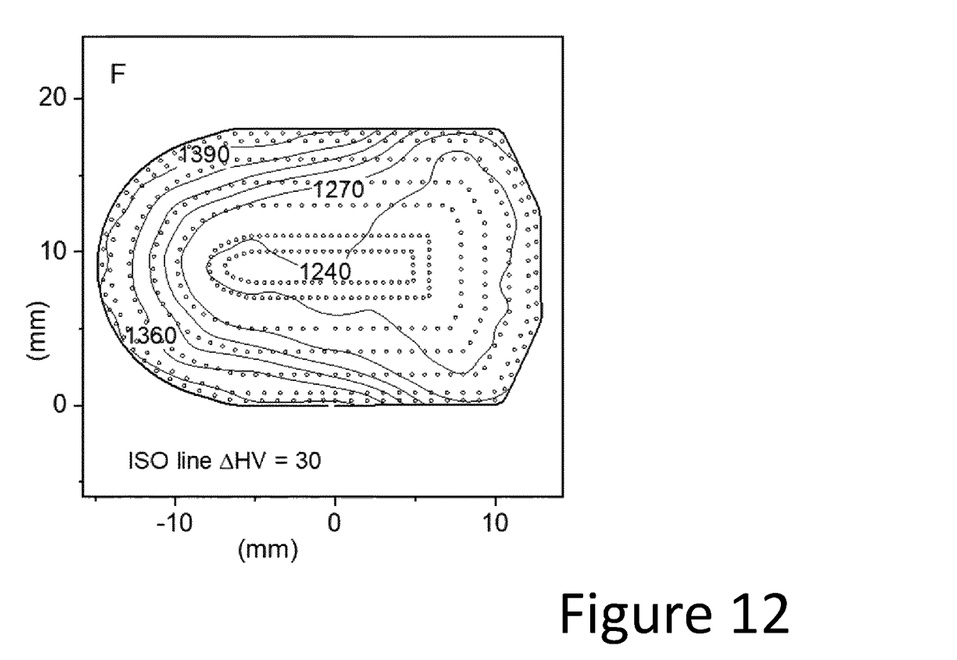
Figure 13:
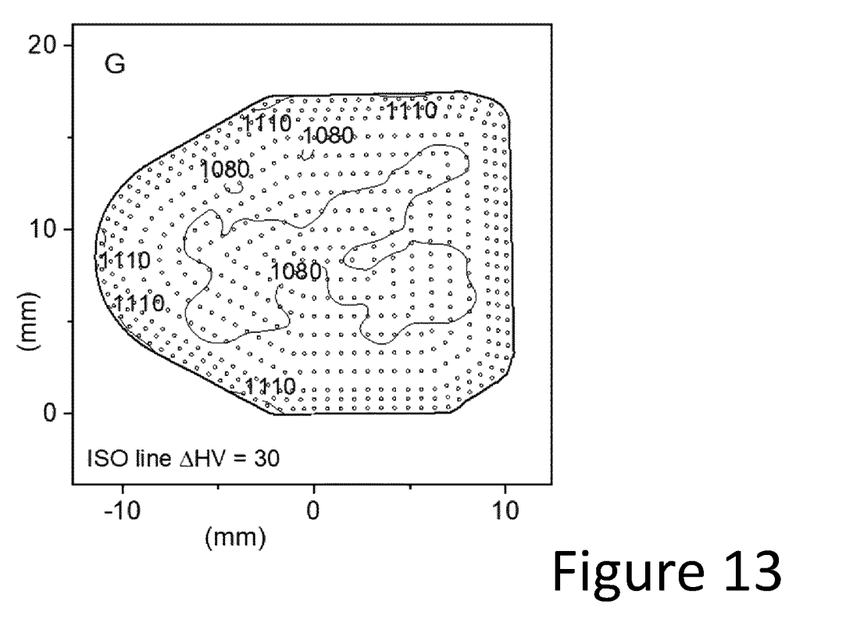
Figure 14:
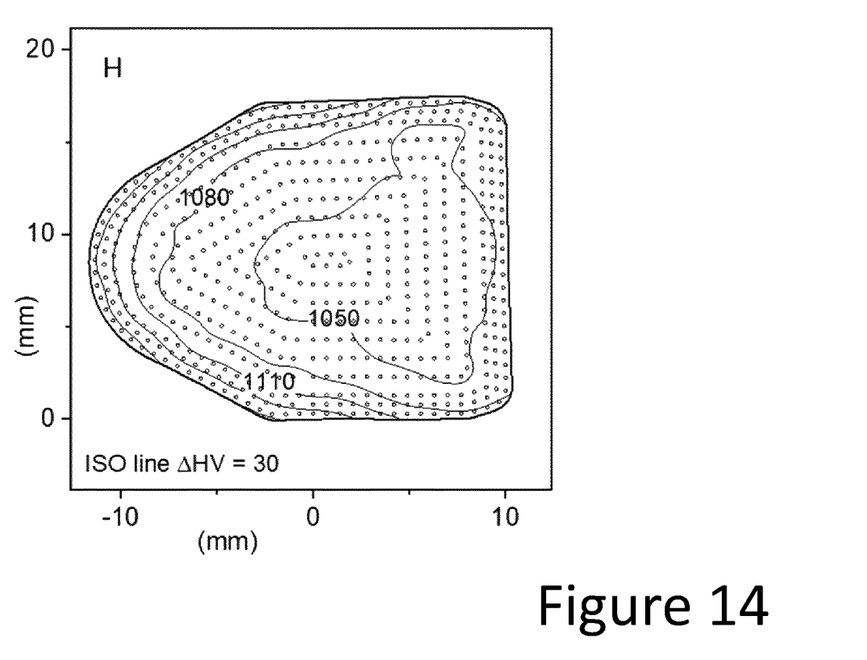
Figure 15:
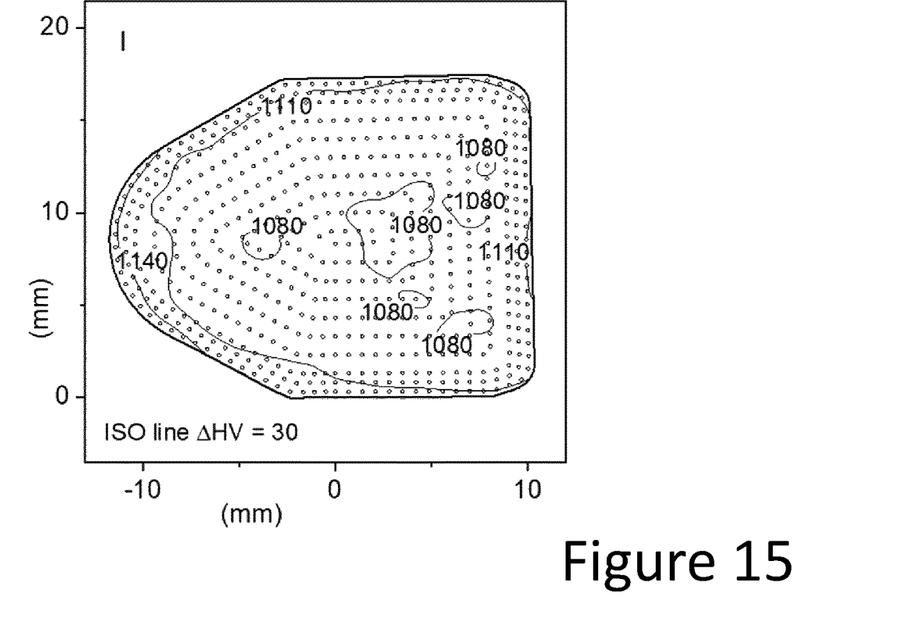
Figure 16:
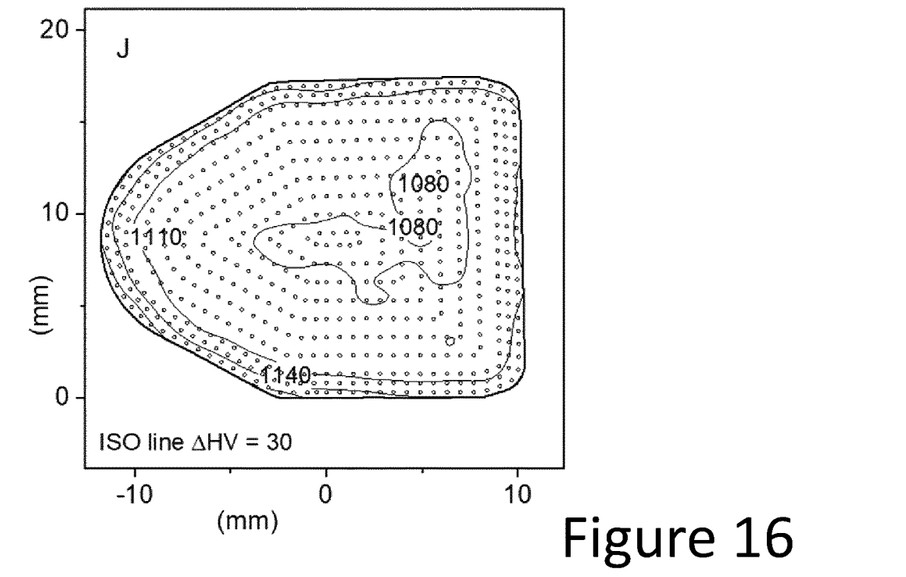
Figure 17:
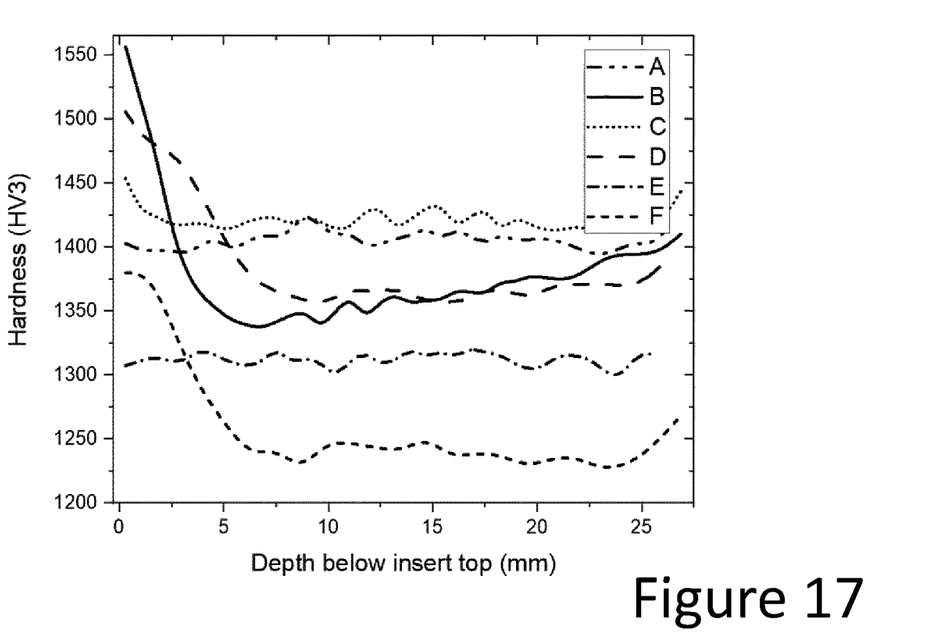
FIG. 17: HV3 centre line plots for samples A, B, C, D, E and F.
Figure 18:
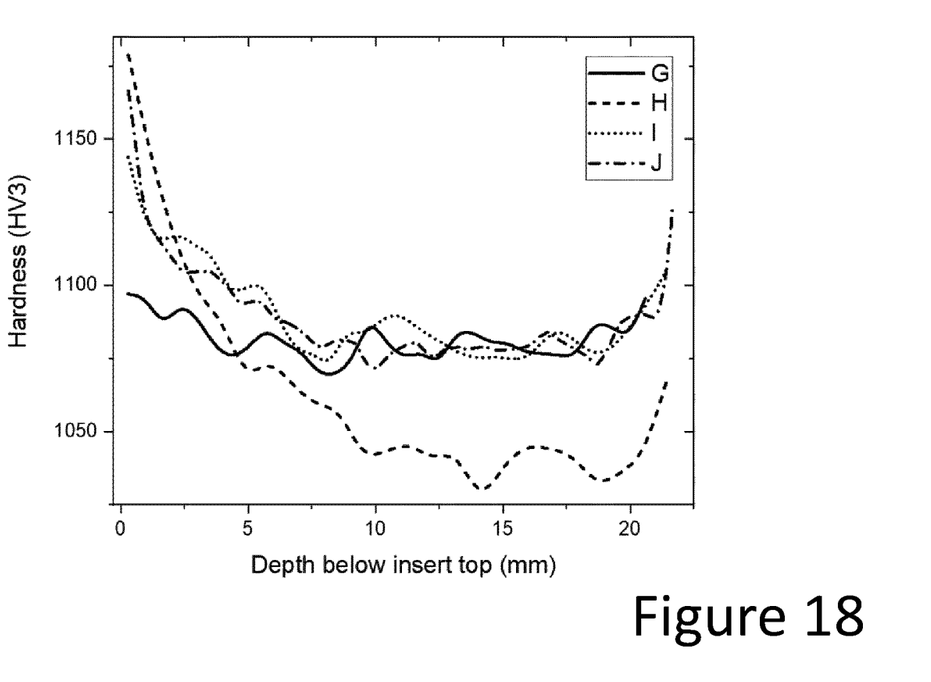
FIG. 18: HV3 centre line plots for samples G, H, I and J.

Hardness measurements were made according to the description explained hereinabove for the samples described in table 1. FIGS. 7-16 show iso-hardness plots for samples A, B, C, D, E, F, G, H, I and J respectively. FIG. 17 shows the HV3 centre line plots for samples A, B, C, D, E and F; FIG. 18 shows the HV3 centre line plots for samples G, H, I and J. Key measurements are summarised in table 4. It can be seen from FIGS. 17 and 18 and from table 4 that the HV3 hardness at a depth of 0.3 mm is at 3% greater than the HV3 hardness in the bulk of the cemented carbide mining insert.

TABLE 4

Hardness profiles

| Sample | HV3 Hardness at a 0.3 mm depth from the surface where the slurry was applied | HV3 Hardness in the bulk | % HV3 difference from bulk to 0.3 mm from surface |
| --- | --- | --- | --- |
| D (invention) | 1505 | 1365 | 11 |
| F (invention) | 1380 | 1240 | 12 |
| J (invention) | 1135 | 1070 | 6 |

Example 3—Insert Compression Test

The toughness of drill bit inserts of samples B, D and F were characterized using an insert compression (IC) test before and after "High energy tumbling" (HET). The HET was conducted using a ERBA 120 centrifugal tumbler at 180 RPM for 40 minutes with 100 kg of media in the form of carbide balls of 13 mm in diameter.

The IC test method involves compressing a drill bit insert between two plane-parallel hard counter surfaces, at a constant displacement rate, until the failure of the insert. A test fixture based on the ISO 4506:2017 (E) standard "Hardmetals—Compression test" was used, with cemented carbide anvils of hardness exceeding 2000 HV, while the test method itself was adapted to toughness testing of rock drill inserts. The fixture was fitted onto an Instron 5989 test frame.

The loading axis was identical with the axis of rotational symmetry of the inserts. The counter surfaces of the fixture fulfilled the degree of parallelism required in the ISO 4506:2017 (E) standard, i.e. a maximum deviation of 0.5 μm/mm. The tested inserts were loaded at a constant rate of crosshead displacement equal to 0.6 mm/min until failure, while recording the load-displacement curve. The compliance of the test rig and test fixture was subtracted from the measured load-displacement curve before test evaluation. Three inserts were tested per sample type. The counter surfaces were inspected for damage before each test. Insert failure was defined to take place when the measured load suddenly dropped by at least 1000 N. Subsequent inspection of tested inserts confirmed that this in all cases this coincided with the occurrence of a macroscopically visible crack. The material toughness was characterized by means of the total absorbed deformation energy until fracture. The fracture energy was compared for each sample before and after HET, shown in Table 5. It can be seen that the increase in fracture energy post HET is much greater for the inventive samples compared to sample B.

TABLE 5

Increase in fracture energy post HET

| Sample | Increase in fracture energy measured comparing samples before to after HET |
| --- | --- |
| B (comparative) | +111% |
| D (invention) | +154% |
| F (invention) | +180% |

Example 4—Wear Tests

Wear tests of the samples having an outer diameter of 10 mm were conducted by mounting the sample so that its tip pressed against a rotating granite rock cylinder in a lathe with the load set by a sensor. In these tests a red granite rock cylinder was used, a load of approximately 10 kg was applied and the rock cylinder was rotated at speed of 189 rpm. A constant flow of tap water was fed close to the interface between sample and rock. In order for the sample to meet new rock surface, a horizontal feed rate of 0.9 mm/s was applied. The turning distance for these tests was between 150-180 m. The sample volume loss is calculated from the measured mass loss and average sample density and gives a quantitative measurement of wear. The results of the wear tests are shown in table 6.

TABLE 6

Wear test results

| Sample | Average volume loss (mm$^3$/m) |
| --- | --- |
| A (comparative) | 1.38E−03 |
| B (comparative) | 1.00E−03 |
| C (comparative) | 1.30E−03 |
| D (inventive) | 7.86E−04 |
| E (comparative) | 1.00E−03 |
| F (inventive) | 9.23E−04 |
| G (comparative) | 2.80E−03 |
| H (comparative) | 2.10E−03 |
| I (comparative) | 1.93E−03 |
| J (inventive) | 1.71E−03 |

Table 6 shows that the inventive samples have a lower wear rate compared to the comparative samples for the same binder content.

The invention claimed is:

1. A cemented carbide mining insert comprising one or more hard-phase components and a binder, a mass ratio of % Cr/% binder in a bulk of the insert being at least 0.03, wherein there is a % Cr/% binder mass ratio gradient from at least one part of a surface of the insert to the bulk of the cemented carbide mining insert, wherein $(R_{max}+R_{min})/2$ is at a depth of between 8-70%, in percentage of a total height of the cemented carbide mining insert post sintering, where $R_{max}$ is a maximum % Cr/% binder mass ratio and $R_{min}$ is a minimum % Cr/% binder mass ratio.

2. The cemented carbide mining insert according to claim 1, wherein the maximum % Cr/% binder mass ratio ($R_{max}$) is at least 0.010 greater than the % Cr/% binder mass ratio in the bulk ($R_{bulk}$) of the cemented carbide mining insert.

3. The cemented carbide mining insert according to claim 1, wherein there is a minimum % binder (% binder$_{min}$) at a depth, in percentage of the total height of the cemented carbide mining insert post sintering, of 0-8%.

4. The cemented carbide mining insert according to claim 3, wherein the ratio of minimum % binder (% binder$_{min}$)/% binder in the bulk (% binder$_{bulk}$) is between 0.2-0.99.

5. The cemented carbide mining insert according to claim 1, wherein there is a hardness gradient from at least one part of the surface to the bulk of the cemented carbide, such that the HV3 hardness at a depth of 0.3 mm is 3% greater than the HV3 hardness in the bulk of the cemented carbide mining insert.

* * * * *